United States Patent
Laboda et al.

(10) Patent No.: US 9,897,100 B2
(45) Date of Patent: Feb. 20, 2018

(54) IN-LINE CONTINUOUS FLOW LIQUID-GAS SEPARATOR-PUMP

(71) Applicant: HONEYWELL INTERNATIONAL INC., Morristown, NJ (US)

(72) Inventors: Daniel J. Laboda, Niles, MI (US); Richard Rateick, South Bend, IN (US); Christopher Gedeon, South Bend, IN (US); Gary A. Valencourt, Niles, MI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 186 days.

(21) Appl. No.: 14/688,484

(22) Filed: Apr. 16, 2015

(65) Prior Publication Data

US 2016/0305440 A1    Oct. 20, 2016

(51) Int. Cl.

| | |
|---|---|
| *B01D 46/18* | (2006.01) |
| *F04D 29/22* | (2006.01) |
| *B01D 19/00* | (2006.01) |
| *B01D 45/14* | (2006.01) |
| *B01D 45/12* | (2006.01) |

(Continued)

(52) U.S. Cl.
CPC ..... *F04D 29/2288* (2013.01); *B01D 19/0068* (2013.01); *B01D 19/0073* (2013.01); *B01D 19/0094* (2013.01); *B01D 45/12* (2013.01); *B01D 45/14* (2013.01); *B04B 5/12* (2013.01); *F04D 31/00* (2013.01); *B04B 2005/125* (2013.01); *F01M 2013/0422* (2013.01)

(58) Field of Classification Search
CPC ... F04D 29/2288; F04D 1/00; B01D 19/0068; B01D 19/0073; B01D 45/14; B01D 45/12; F01M 2013/0422; B04B 5/12; B04B 2005/125
See application file for complete search history.

(56) References Cited

U.S. PATENT DOCUMENTS 2,575,568 A    11/1951    Topanelian, Jr.
3,234,716 A *    2/1966    Sevin ............... B01D 45/14
                                                                        209/710

(Continued)

OTHER PUBLICATIONS

Schutz, S., et al.; CFD-Based Development of Oil Droplet Separators in Crankcase Ventilation Systems; Institute of Mechanical Process Engineering; EACC 2007 3rd European Automotive CFD Conference, Frankfurt, Germany Jul. 5-6, 2007.

*Primary Examiner* — Dung H Bui
(74) *Attorney, Agent, or Firm* — Lorenz & Kopf, LLP (57) ABSTRACT

An in-line continuous flow liquid-gas separator-pump includes a housing, a rotor, a plurality of tubular flow passages, and a plurality of gas flow passages. The rotor includes a rotor first end, a rotor second end, an outer surface, and an inner surface that defines an inner chamber in fluid communication with the purge gas outlet. The tubular flow passages are formed in the rotor and extend between the rotor first end and the rotor second end. Each tubular flow passage includes a fluid inlet that is disposed adjacent the rotor first end and in fluid communication with the liquid/gas inlet, and a fluid outlet that is disposed adjacent the rotor second end and is in fluid communication with the liquid outlet. The gas flow passages are formed in the rotor, and each provides fluid communication between one of the tubular flow passages and the inner chamber.

17 Claims, 9 Drawing Sheets

(51) Int. Cl.
*B04B 5/12* (2006.01)
*F04D 31/00* (2006.01)
F01M 13/04 (2006.01)

(56) References Cited

U.S. PATENT DOCUMENTS

| | | | |
|---|---|---|---|
| 3,240,002 | A | 3/1966 | O'Rourke, Jr. et al. |
| 5,735,789 | A | 4/1998 | Borgstrom et al. |
| 8,062,400 | B2 * | 11/2011 | Maier ................ B01D 17/0217 210/360.1 |
| 8,657,931 | B2 * | 2/2014 | Short .................... F01M 13/04 55/408 |
| 2006/0090430 | A1 | 5/2006 | Trautman et al. |
| 2014/0238237 | A1 | 8/2014 | Holm et al. |

\* cited by examiner

IN-LINE CONTINUOUS FLOW LIQUID-GAS SEPARATOR-PUMP

TECHNICAL FIELD

The present invention generally relates to liquid-gas separation, and more particularly relates to an in-line continuous flow liquid-gas separator-pump that may, if desired, be used in a fuel deoxygenation system.

BACKGROUND

Modern aircraft rely on efficient heat sink options for thermal management. The jet fuel that is supplied to the propulsion engines is often a convenient sink for excess thermal energy, and the energy is efficiently retained in the engine thermodynamic cycle. The presence of molecular oxygen or entrained air limits the ability of fuel to absorb heat beyond approximately 300° F. without undergoing deleterious thermal degradation. Thermal degradation often appears as solid materials which adhere to surfaces and degrades fuel system performance. Moreover, wetted surfaces comprised of metallic materials can further catalyze the reaction of oxygen with fuel and subsequent formation of carbonaceous, coke-like material.

It is possible to substantially reduce coke-based fuel degradation by removing oxygen from the fuel prior to increasing the fuel temperature beyond about 300° F. The process of removing oxygen from the fuel, generally referred to as fuel deoxygenation, is typically accomplished by sparging an inert gas into the fuel. Eventually, the oxygen and inert gas must be removed from the fuel and then, after it is removed, the pressure of the fuel needs to be boosted. Several techniques have been developed to perform this operation. In the context of an aircraft jet engine, however, the options are limited due to size and weight concerns.

Hence, there is a need for device that can quickly and efficiently degas a liquid, such as jet engine fuel, and that is relatively lightweight, relatively compact, and that can boost the pressure of the degassed liquid. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an in-line continuous flow liquid-gas separator-pump including a housing, a rotor, a plurality of tubular flow passages, and a plurality of gas flow passages. The housing has a liquid/gas inlet, a liquid outlet, and a purge gas outlet. The rotor is adapted to receive a drive torque and is configured, upon receipt thereof, to rotate. The rotor includes a rotor first end, a rotor second end, an inner surface, and an outer surface. The inner surface defines an inner chamber in fluid communication with the purge gas outlet. The tubular flow passages are formed in the rotor and extend between the rotor first end and the rotor second end. Each tubular flow passage includes a fluid inlet and a fluid outlet. The fluid inlet is disposed adjacent the rotor first end and is in fluid communication with the liquid/gas inlet. The fluid outlet is disposed adjacent the rotor second end and is in fluid communication with the liquid outlet. The gas flow passages are formed in the rotor. Each gas flow passage provides fluid communication between one of the tubular flow passages and the inner chamber.

In another embodiment, a rotor structure includes a rotor, a plurality of tubular flow passages, and a plurality of gas flow passages. The rotor has a truncated cone shape and includes a rotor first end, a rotor second end, an inner surface, and an outer surface. The rotor first end has a first diameter, the rotor second end has a second diameter that is smaller than the first diameter, and the inner surface defines an inner chamber. The tubular flow passages are formed in the rotor and extend, in a splayed manner, between the rotor first end and the rotor second end. Each tubular flow passage includes a fluid inlet and a fluid outlet. The fluid inlet is disposed adjacent the rotor first end and is in fluid communication with the liquid/gas inlet, and the fluid outlet is disposed adjacent the rotor second end. The gas flow passages are formed in the rotor. Each gas flow passage provides fluid communication between one of the tubular flow passages and the inner chamber.

In yet another embodiment, an aircraft fuel deoxygenation system includes a boost pump, a contactor-separator, and an in-line continuous flow liquid-gas separator-pump. The boost pump is adapted to receive fuel from a fuel source and inert gas from an inert gas source. The boost pump is configured to mix the fuel and inert gas and supply a fuel/gas mixture. The contactor-separator is coupled to receive the fuel/gas mixture and is configured to remove oxygen from the fuel and thereby generate and supply deoxygenated fuel with entrained purge gas and separated purge gas. The in-line continuous flow liquid-gas separator-pump is coupled to receive the deoxygenated fuel with entrained purge gas and is configured to separate and remove the entrained purge gas from the deoxygenated fuel and supply the deoxygenated fuel and additional purge gas. The in-line continuous flow liquid-gas separator-pump includes a housing, a rotor, a plurality of tubular flow passages, and a plurality of gas flow passages. The housing has a liquid/gas inlet, a liquid outlet, and a purge gas outlet. The liquid/gas inlet is coupled to receive the deoxygenated fuel with entrained purge gas. The rotor is adapted to receive a drive torque and is configured, upon receipt thereof, to rotate. The rotor includes a rotor first end, a rotor second end, an inner surface, and an outer surface. The inner surface defines an inner chamber in fluid communication with the purge gas outlet. The tubular flow passages are formed in the rotor and extend between the rotor first end and the rotor second end. Each tubular flow passage includes a fluid inlet and a fluid outlet. The fluid inlet is disposed adjacent the rotor first end and is in fluid communication with the liquid/gas inlet. The fluid outlet is disposed adjacent the rotor second end and is in fluid communication with the liquid outlet. The gas flow passages are formed in the rotor. Each gas flow passage provides fluid communication between one of the tubular flow passages and the inner chamber.

Furthermore, other desirable features and characteristics of the fuel deoxygenation system and in-line continuous flow liquid-gas separator-pump will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

With the above in mind, it will be appreciated that although embodiments of an in-line continuous flow liquid-gas separator-pump are described herein in the context of an aircraft fuel deoxygenation system, the various embodiments may be implemented in any one of numerous liquid-gas separation systems, not just liquid deoxygenation systems, not just aircraft fuel systems, and not just aircraft or other types of fuels.

Figure 1:
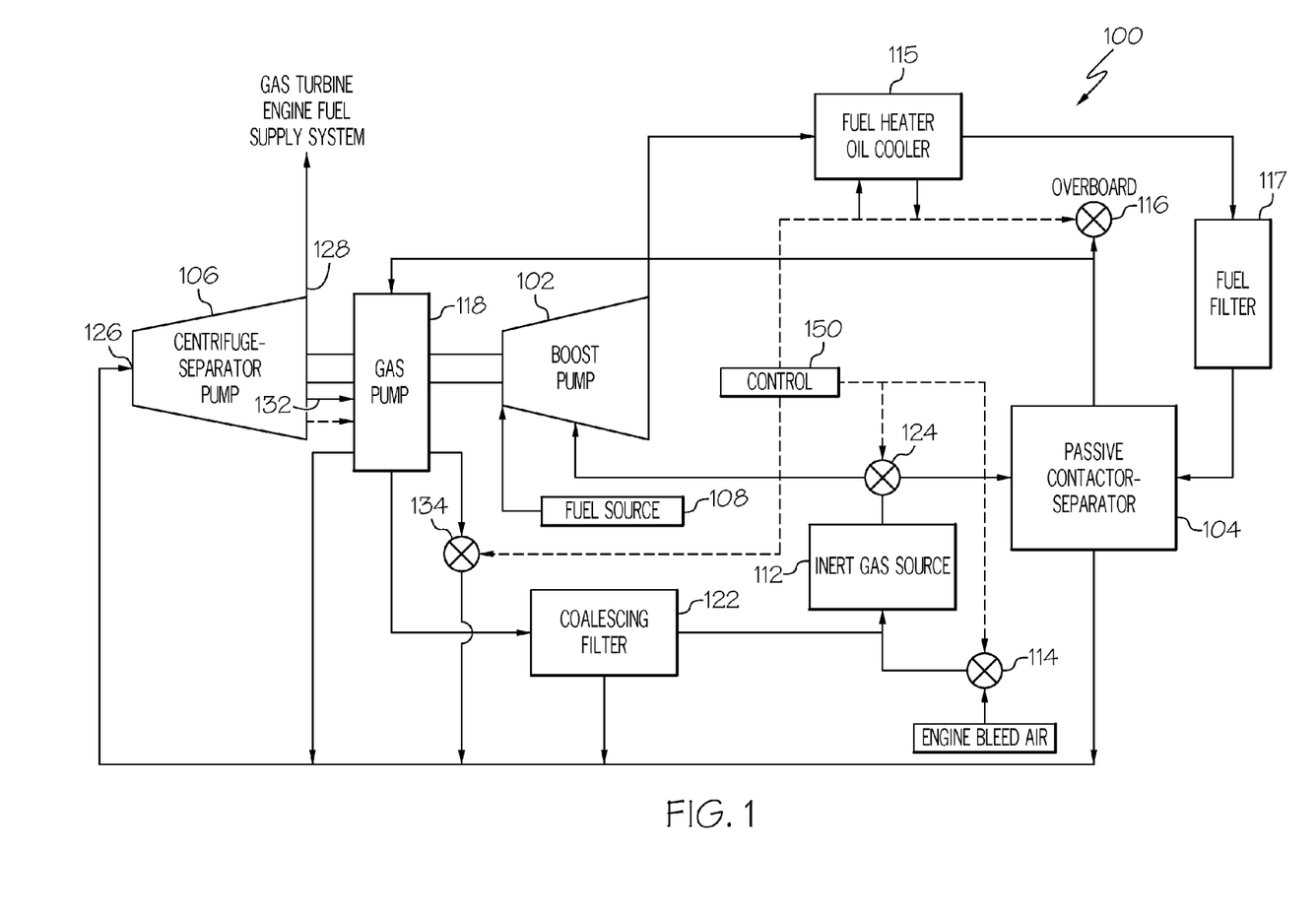
FIG. 1 depicts a schematic representation of one embodiment of an aircraft fuel deoxygenation system.

Referring first to FIG. 1, an embodiment of an aircraft fuel deoxygenation system 100 is depicted. The depicted system 100 includes at least a boost pump 102, a contactor-separator 104, and an in-line continuous flow liquid-gas separator-pump 106. The boost pump 102 is coupled to receive fuel from a fuel source 108 and inert gas from an inert gas source 112. It should be note that the fuel, under normal equilibrium conditions at standard temperature and pressure, will normally have some oxygen dissolved therein. The boost pump 102 is also coupled to receive a drive torque from a non-illustrated torque source, such as a motor or a gas turbine engine, and is configured to uniformly and intimately mix the fuel and inert gas to supply a fuel/gas mixture for subsequent deoxygenation.

It will be appreciated that the fuel source 108 and the inert gas source 112 may be variously configured and implemented. In the depicted embodiment, the fuel source 108 is preferably an onboard aircraft fuel tank that receives and stores fuel for use by various fuel-consuming loads, such as a gas turbine engine. The inert gas source 112 may be a stand-alone source of inert gas, such as an inert gas storage tank or one or more inert gas bottles. Alternatively, the inert gas source 112 may be an inert gas generating system that generates inert gas from, for example, engine bleed air that is selectively supplied from a non-illustrated gas turbine engine via a bleed air inlet valve 114. Some non-limiting examples of such systems include one or more of an on-board inert gas generating system (OBIGGS), a pressure swing adsorption (PSA) system, a catalytic reactor, a plurality of membranes, just to name a few. It will be appreciated that the inert gas is preferably nitrogen ($N_2$), but may be one of the other inert gasses.

It will additionally be appreciated that in some embodiments, such as the one depicted in FIG. 1, the system 100 may additionally include a heat exchanger 115 and a fuel filter 117 between the boost pump 102 and the contactor-separator 104. The heat exchanger 115 is coupled to receive the fuel/gas mixture from the pump 102 and a fluid from a non-illustrated fluid source. The fluid and fluid source may vary, but in one embodiment the fluid is lubricant, such as oil, supplied from a non-illustrated gas turbine engine. In such embodiments, the heat exchanger functions as a fuel heater/oil cooler. Regardless, the heat exchanger 115 is configured to transfer heat from the fluid to the fuel/gas mixture to thereby increase fuel/gas mixture temperature prior to supplying the fuel/gas mixture to the contactor-separator 104, to thereby increase the deoxygenation drive potential and improve deoxygenation efficiency.

The fuel filter 117 is coupled between the heat exchanger 115 and the contactor-separator 104. The fuel filter 117 is configured to remove particulate from the fuel/gas mixture, and break up inert gas bubbles in the fuel/gas mixture into relatively smaller sized bubbles. This latter function will improve the efficiency of the downstream deoxygenation processes.

Whether or not the system 100 includes the heat exchanger 115 and/or the fuel filter 117, the contactor-separator 104 is coupled to receive the fuel/gas mixture and is configured to implement the functions of both a contactor and a separator. In some embodiments, as depicted in FIG. 1, the contactor-separator 104 may also receive inert gas from the inert gas source 112. As is generally known, a contactor functions to intensify the mass-transfer of dissolved oxygen to the inert gas by maximizing the contact surface between the fuel and inert gas, and to providing further mixing of the fuel and inert gas to thereby facilitate efficient mass transfer. A separator functions to separate the deoxygenated fuel and the inert gas/oxygen purge gas that is generated. Thus, the contactor-separator 102, upon receipt of the fuel/gas mixture and, in some embodiments, the inert gas, removes a significant portion of the oxygen from the fuel and thereby generates and supplies deoxygenated fuel (e.g., <2-6% oxygen) and purge gas. The deoxygenated fuel is supplied to the in-line centrifuge-separator pump 106, and the purge gas is directed overboard via an overboard control valve 116, or is directed to a gas pump 118 (described further below), or both.

Figure 2:
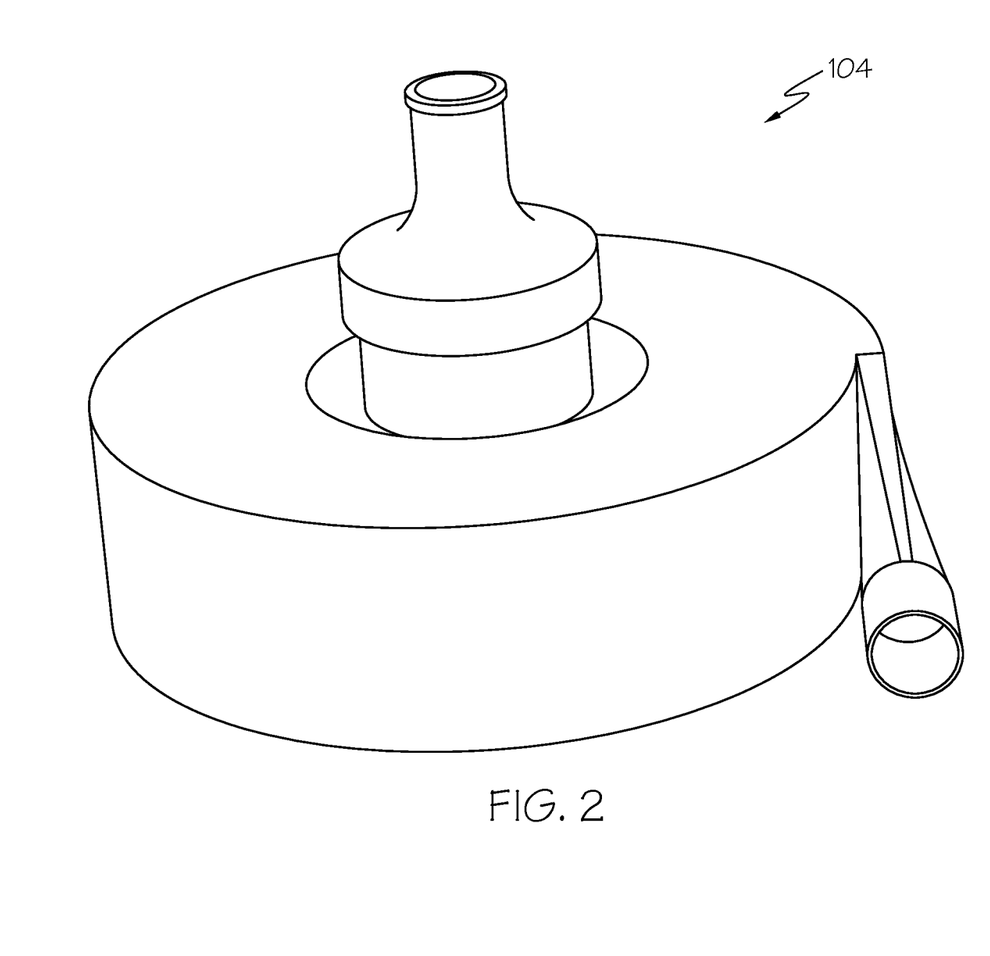
FIGS. 2 and 3 depict plan views of example embodiments of a passive transitional contactor-separator that may be used to implement the system of FIG. 1.
Figure 3:
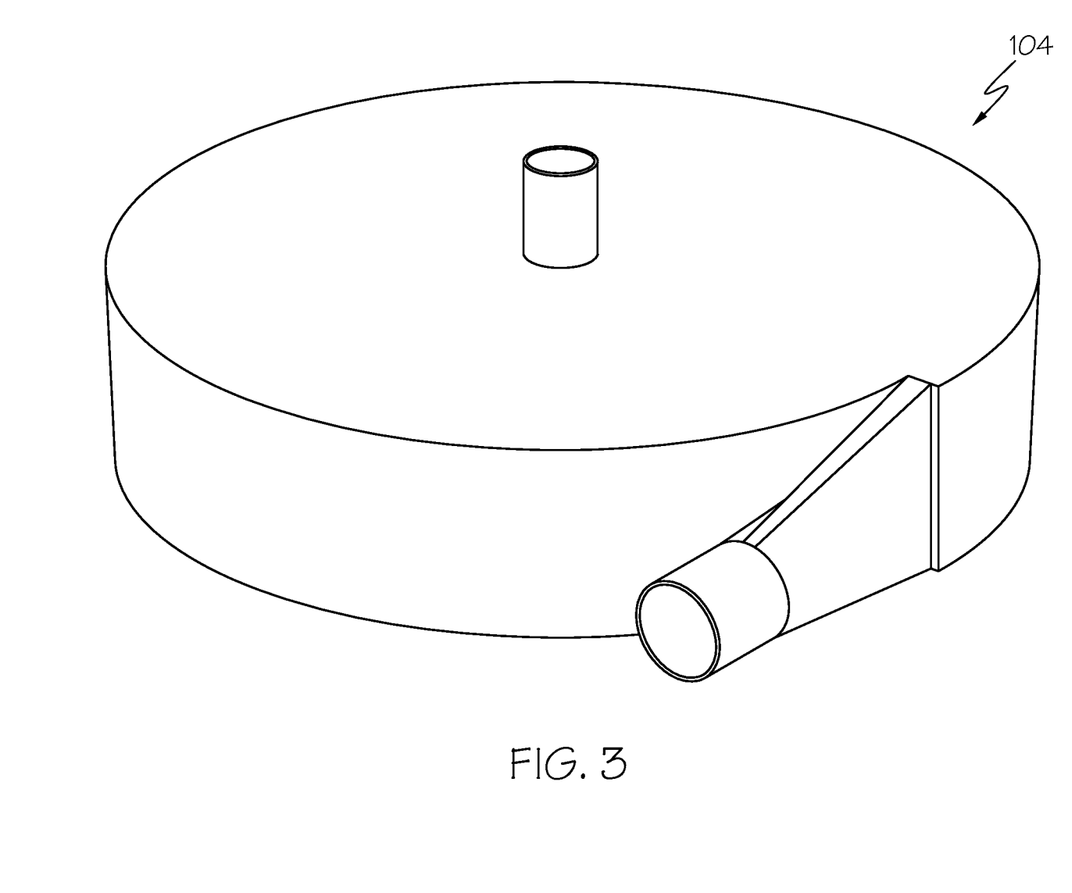
Figure 4:
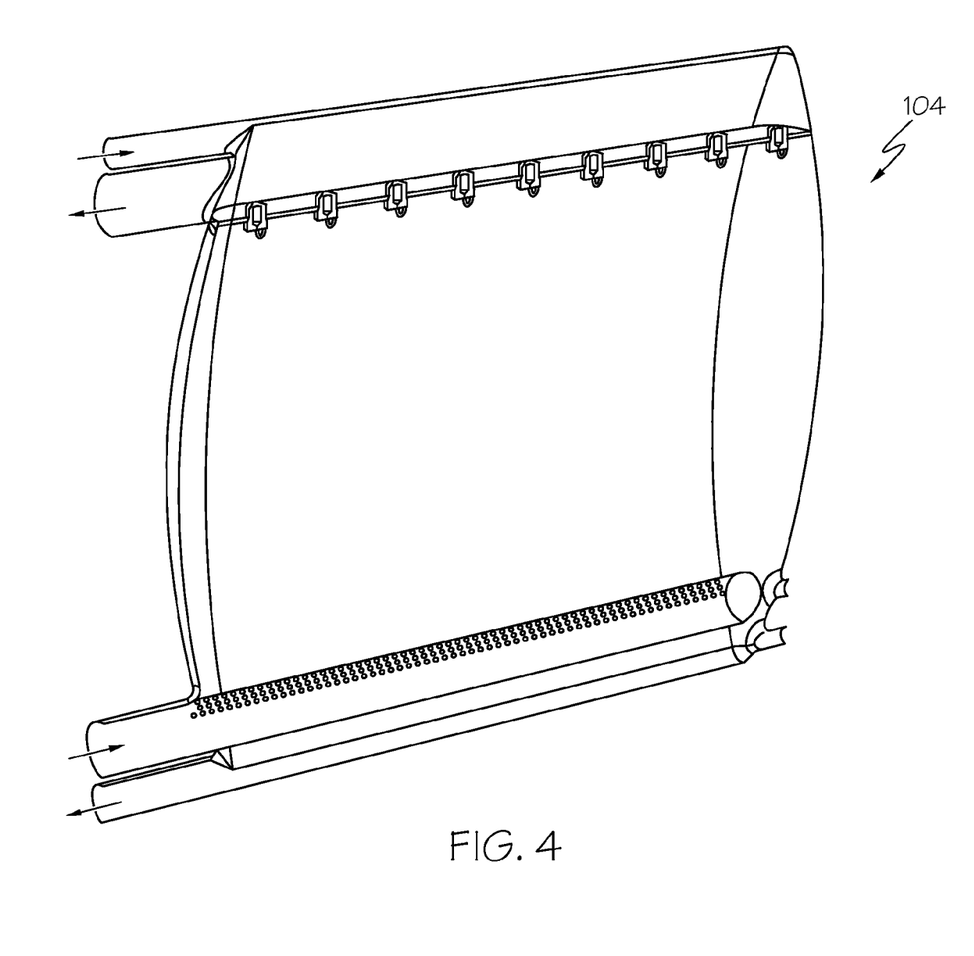
FIG. 4 depicts a cross section plan view of another embodiment of a passive contactor-separator that may be used to implement the system of FIG. 1.

It will be appreciated that the contactor-separator 104 may be variously configured and implemented, but is preferably a passive device. In one embodiment, the passive contactor-separator 104 is configured and implemented using any one of the numerous passive contactor-separators 104 described in co-pending U.S. patent application Ser. No. 14/539,279, filed Nov. 12, 2014, and entitled, "FUEL DEOXYGENATION SYSTEM CONTACTOR-SEPARATOR," or using any one of numerous atomizing contactor-separators 104 described in U.S. patent application Ser. No. 14/570,152, filed Dec. 15, 2014, and entitled, "AIRCRAFT FUEL DEOXYGENATION SYSTEM." The entirety of each of these patent applications is incorporated herein by reference. For completeness, embodiments of the contactor-separators 104 described these applications are depicted herein in FIGS. 2-4. Before proceeding further, it is noted that in some embodiments the system 100 may be implemented using either or both of these contactor-separators 104.

Figure 5:
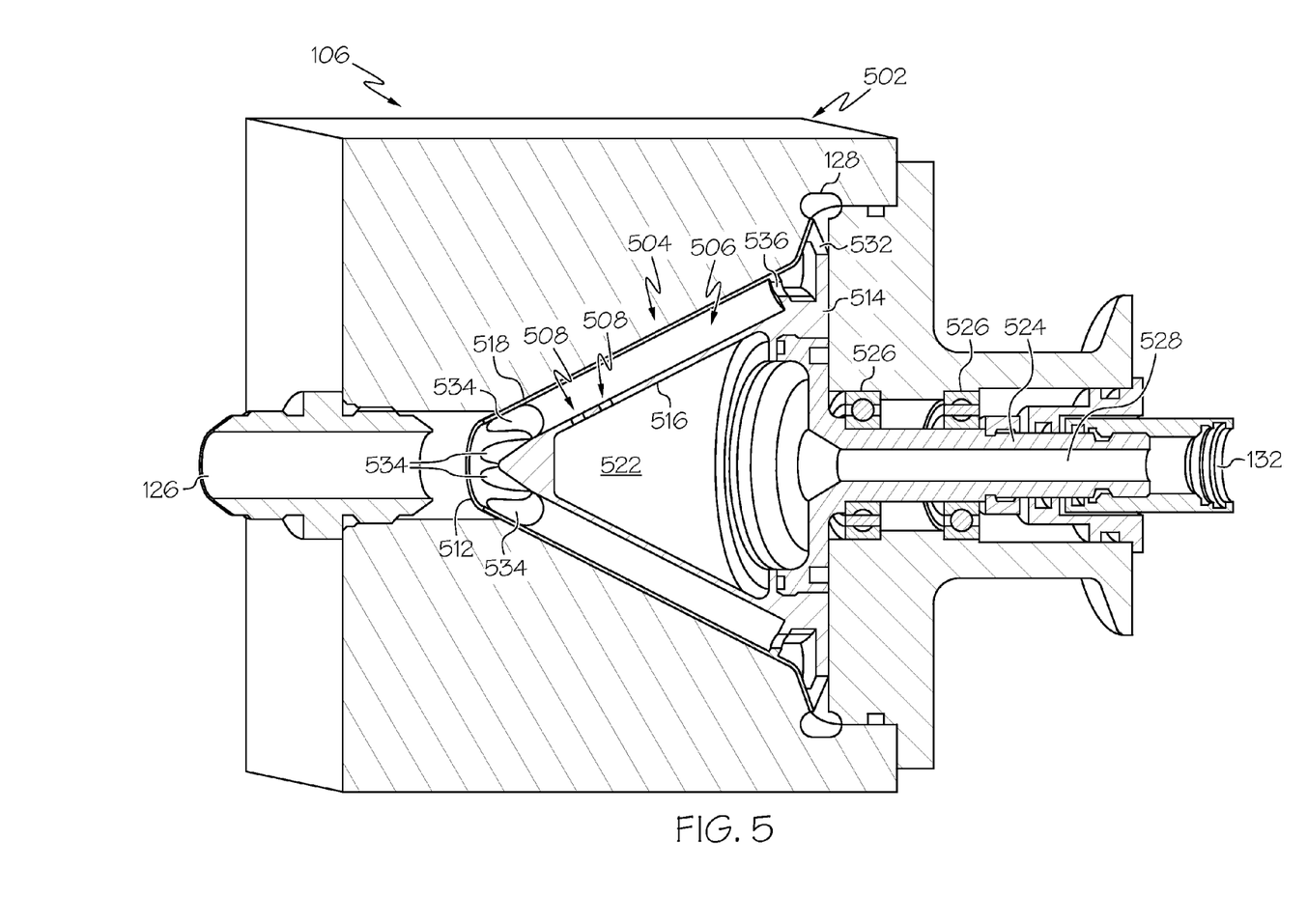
FIGS. 5-9 depict various views of one embodiment of an in-line continuous flow liquid-gas separator-pump that may be used to implement the system of FIG. 1.
Figure 6:
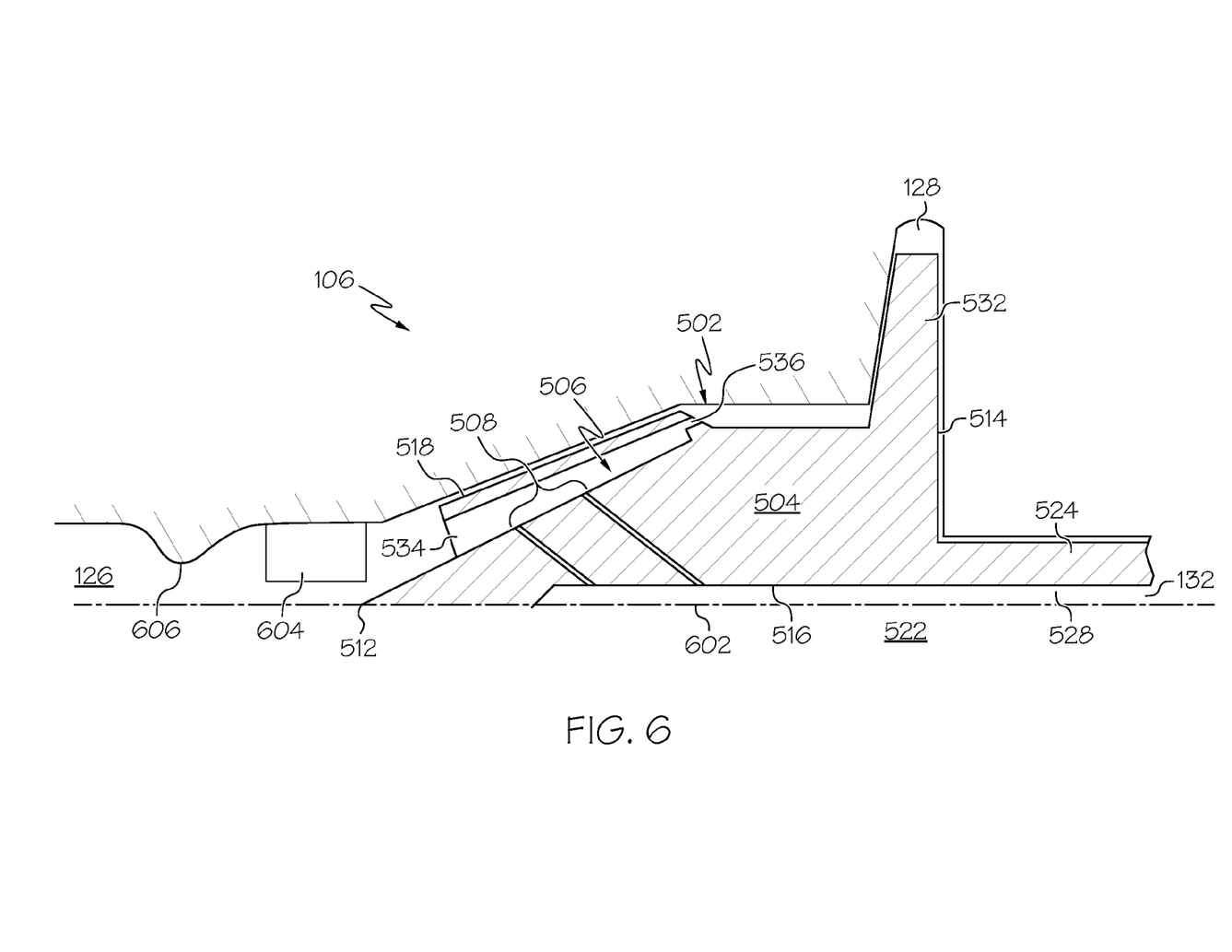
Figure 7:
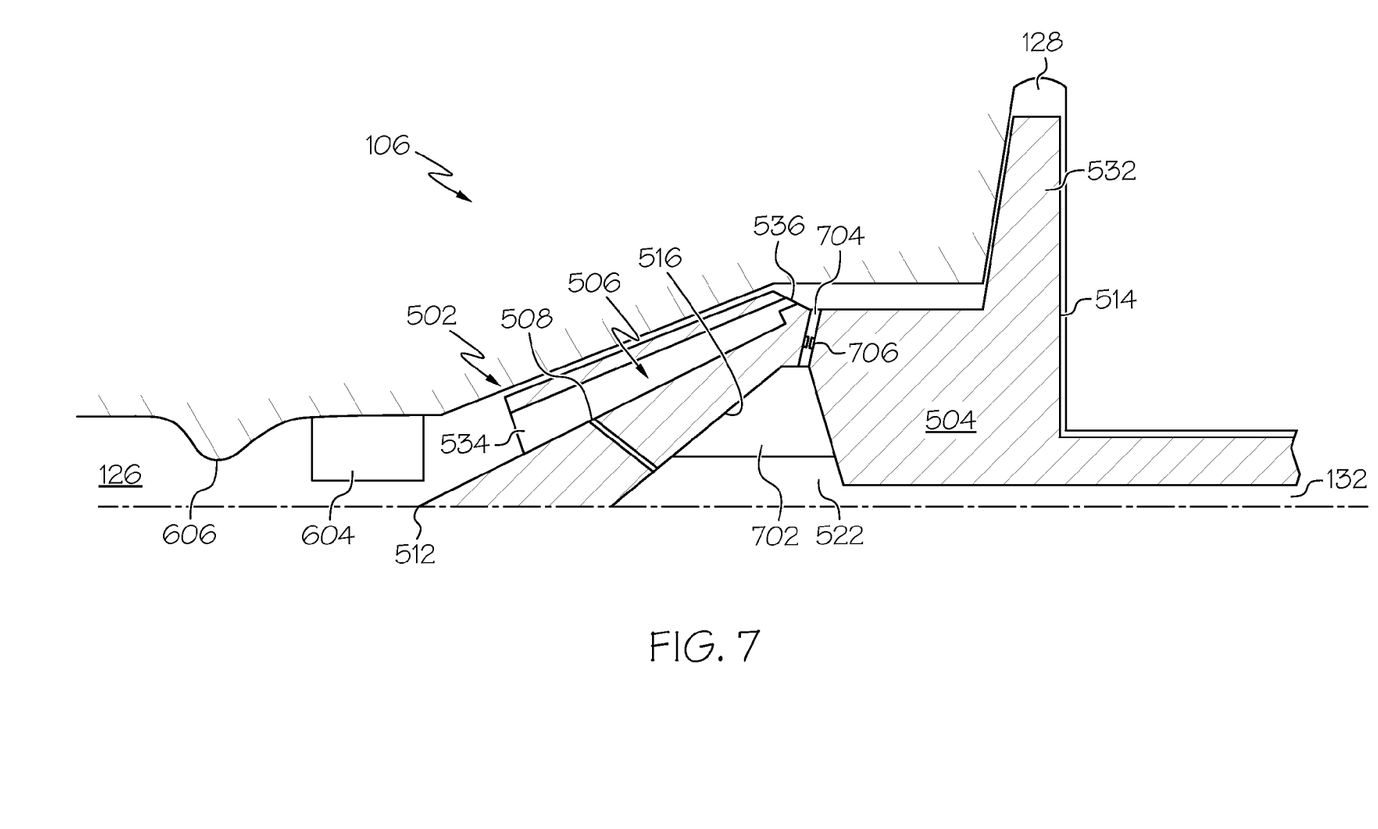

Regardless of how the contactor-separator 104 is specifically implemented, the deoxygenated fuel and entrained purge gas, as noted above and as depicted in FIG. 1, is supplied to the in-line continuous flow liquid-gas separator-pump 106. The in-line continuous flow liquid-gas separator-pump 106 includes a liquid/gas inlet 126, a liquid outlet 128, and a purge gas outlet 132. The in-line continuous flow liquid-gas separator-pump 106 is configured, upon receipt of the deoxygenated fuel and entrained purge gas, to further separate the entrained purge gas from the deoxygenated fuel. The in-line continuous flow liquid-gas separator-pump 106 may be variously configured to implement this function. One particular embodiment, which is depicted in FIGS. 5-7, will be described further below. Before doing so, however, the remainder of the system 100 will be described.

Still referring to FIG. 1, it is seen that the deoxygenated fuel that is discharged from the liquid outlet 128 is supplied to a gas turbine engine supply system for use in a non-illustrated gas turbine engine. Preferably, the deoxygenated fuel is supplied to, for example, a high-pressure fuel pump, such as a gear pump or variable displacement piston pump, one or more additional control valves and components, and various heat sources to absorb waste thermal energy, before being supplied to the gas turbine engine combustor.

As FIG. 1 further depicts, the entrained purge gas that is separated in and discharged from the in-line continuous flow liquid-gas separator-pump 106 is supplied to the gas pump 118. As previously mentioned, the gas pump 118 may also receive purge gas discharged from the contactor-separator 104. The gas pump 118 is configured to increase the pressure of the received purge gas and, when the inert gas source 112 is an inert gas generator, supply the pressurized purge gas to the inert gas source 112. Although the gas pump 118 may be implemented using any one of numerous types of gas pumps 118, it is preferably implemented using a liquid ring vacuum pump (LRVP) (where fuel is used for the sealing fluid), and thus receives a portion of the deoxygenated fuel (illustrated using a dashed line) from the in-line continuous flow liquid-gas separator-pump 106, some spill-over of which is supplied back to the liquid/gas inlet 126 of the in-line continuous flow liquid-gas separator-pump 106. The structure and operation of LRVPs is generally well known in the art, and will thus not be provided. Preferably, as FIG. 1 depicts, the gas pump 118 is coupled to receive a drive torque from the same non-illustrated torque source, such as a motor or a gas turbine engine, as the boost pump 102. It will be appreciated that in other embodiments the torque source may not be the same one that is used for the boost pump 102 and/or the in-line continuous flow liquid-gas separator-pump 106.

The pressurized purge gas that is discharged from the gas pump 118 may include some fuel aerosol. Thus, in some embodiments, a coalescing filter 122 may be coupled between the gas pump 118 and the inert gas source 112. The coalescing filter 122, if includes, is configured to remove any fuel aerosol that may be present in the pressurized purge gas, thereby supplying substantially fuel-free purge gas to the inert gas source 112.

The system 100 may also include a control 150 that is configured to control the positions of various system valves, and thereby control the amount and flow of inert gas and/or purge gas in the system. The number and placement of the system valves may vary, but in the depicted embodiment the system 100 includes the previously mentioned bleed air inlet valve 114, the overboard control valve 116, an inert gas supply control valve 124, and a gas pump fuel discharge control valve 134.

Referring now to FIGS. 5 and 6, and as was mentioned above, a more detailed description of one embodiment of the in-line continuous flow liquid-gas separator-pump 106 will now be described. The in-line continuous flow liquid-gas separator-pump 106 includes a housing 502, a rotor 504, a plurality of tubular flow passages 506, and a plurality of gas flow passages 508. The housing 502 has formed therein the liquid/gas inlet 126, the liquid outlet 128, and the purge gas outlet 132. In the simplified cross section view depicted in FIG. 5, the housing 502 comprises an assembly of several parts. It will be appreciated that this is merely exemplary, and that the housing 502 could be integrally formed.

The rotor 504 is rotationally mounted within the housing 502 and includes a rotor first end 512, a rotor second end 514, an inner surface 516, and an outer surface 518. The inner surface 512 defines an inner chamber 516 that is in fluid communication with the purge gas outlet 132. The rotor 504 is adapted to receive a drive torque and is configured, upon receipt thereof, to rotate. Briefly referring back to FIG. 1, when implemented in the system 100 depicted therein, the rotor 504 is coupled to receive the drive torque from the same non-illustrated torque source, such as a motor or a gas turbine engine, as the boost pump 102. It will be appreciated that in other embodiments the torque source may not be the same one that is used for the boost pump 102 and/or the gas pump 118.

Returning once again to FIGS. 5 and 6, it is seen that the depicted rotor 504 preferably, though not necessarily, has a truncated cone shape. As such, the rotor first end 512 has a first diameter, the rotor second end 514 has a second diameter, and the first diameter is smaller than the second diameter. It is additionally seen that the rotor 504, at least in the depicted embodiment, receives the drive torque via a drive shaft 524, which is rotationally mounted via, for example, a plurality of bearing assemblies 526 (not depicted in FIG. 6). The drive shaft 524 has a purge gas flow passage 528 formed therein that provides fluid communication between the inner chamber 522 and the purge gas outlet 132. Preferably, the rotor second end 514 is configured as a centrifugal pump impeller 532 that extends radially outwardly from the rotor second end 514. The impeller 532, as is generally known, will increase the pressure of the liquid (e.g., fuel) before discharging it from the liquid outlet 128.

The tubular flow passages 506 are formed in the rotor 504 and extend between the rotor first end 512 and the rotor second end 514. Each tubular flow passage 506 includes a fluid inlet 534 and a fluid outlet 534. The fluid inlet 534 is disposed adjacent to the rotor first end 514 and is in fluid communication with the liquid/gas inlet 126. The fluid outlet 534 is disposed adjacent to the rotor second end 514 and is in fluid communication with the liquid outlet 128. It will be appreciated that when the rotor 504 has a truncated cone shape, such as the one depicted in FIGS. 5 and 6, the tubular flow passages 506 preferably extend between the rotor first and second ends 512, 514 in a splayed manner.

The fluid inlet 534 of each tubular flow passage 506 has a fluid inlet diameter, and the fluid outlet 536 of each tubular flow passage has a fluid outlet diameter. Preferably, the fluid outlet diameter is less than the fluid inlet diameter. Moreover, the fluid outlet 536 is preferably disposed at an outermost position from the shaft center line 602 (see FIG. 6). The smaller diameter of the fluid outlets 536, together with the locations thereof, helps prevent gas bubbles from exiting the tubular flow passages 506 and being discharged from the liquid outlet 128.

The gas flow passages 508 are formed in the rotor 504, and each provides fluid communication between one of the tubular flow passages 506 and the inner chamber 522. The embodiment depicted in FIGS. 5 and 6 includes two gas flow passages 508 per tubular flow channel 506. It will be appreciated, however, that this is merely exemplary of one embodiment, and that in other embodiments the in-line continuous flow liquid-gas separator-pump 106 may be implemented with more or less (see, e.g., FIGS. 7-9) than this number of gas flow passages 508.

When the rotor 504 is rotated, and a liquid/gas mixture (e.g., deoxygenated fuel and entrained purge gas) is drawn into the liquid/gas inlet 126, the liquid/gas mixture enters each of the tubular flow passages 506. As the liquid/gas mixture flows through the tubular flow passages 506, relatively larger gas bubbles are separated relatively easily near each fluid inlet 534 and are discharged into the inner chamber 522 via the gas flow passages 508. Relatively smaller gas bubbles, however, require higher g-forces to separate. This occurs further downstream near the fluid outlets 536. The relatively smaller bubbles that are separated then travel upstream toward the fluid inlets 534 along the inner wall of each tubular flow passage 506, and are discharged into the inner chamber 522 via the gas flow passages 508. This recirculation effect effectively doubles the separation time, as the bubbles flow down the length of the tubular flow passages 506 and then back toward the fluid inlets 534.

It should be noted that if the incoming liquid/gas mixture is not rotating, then as it enters the tubular flow passages 506, the flow will impinge on the downstream side of each tubular flow passage 506, and a local low pressure region will be created on the opposite, upstream side. Thus, the gas flow passages 508 are preferably disposed at least slightly closer to each fluid inlet 534. Preferably, in addition to (or instead of) this preferred location, the in-line continuous flow liquid-gas separator-pump 106 may additionally include a pre-swirler 604 (see FIG. 6). The pre-swirler 604, if included, is preferably disposed within the housing 502 upstream of the rotor first end 512, and is configured to rotate the fluid entering the liquid/gas inlet 126. The pre-swirler 604 may be variously implemented, but in the depicted embodiment it is implemented using a plurality of fixed, non-rotating vanes that are designed to rotate the incoming flow.

Before proceeding further, it is noted that the in-line continuous flow liquid-gas separator-pump 106 may additionally include an inlet orifice 606 (see FIG. 6). The orifice 606, if included, is preferably disposed within the housing 502 upstream of the rotor first end 512, and is configured to reduce the pressure of the incoming flow.

Figure 8:
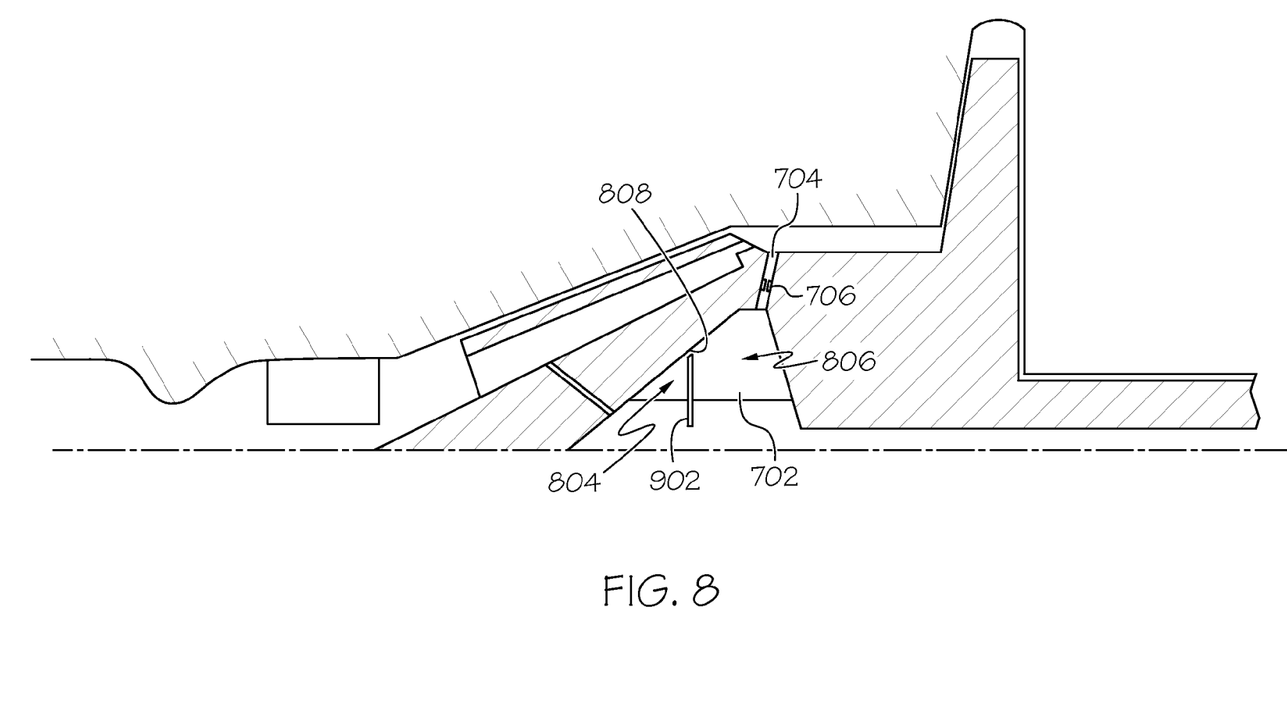
Figure 9:
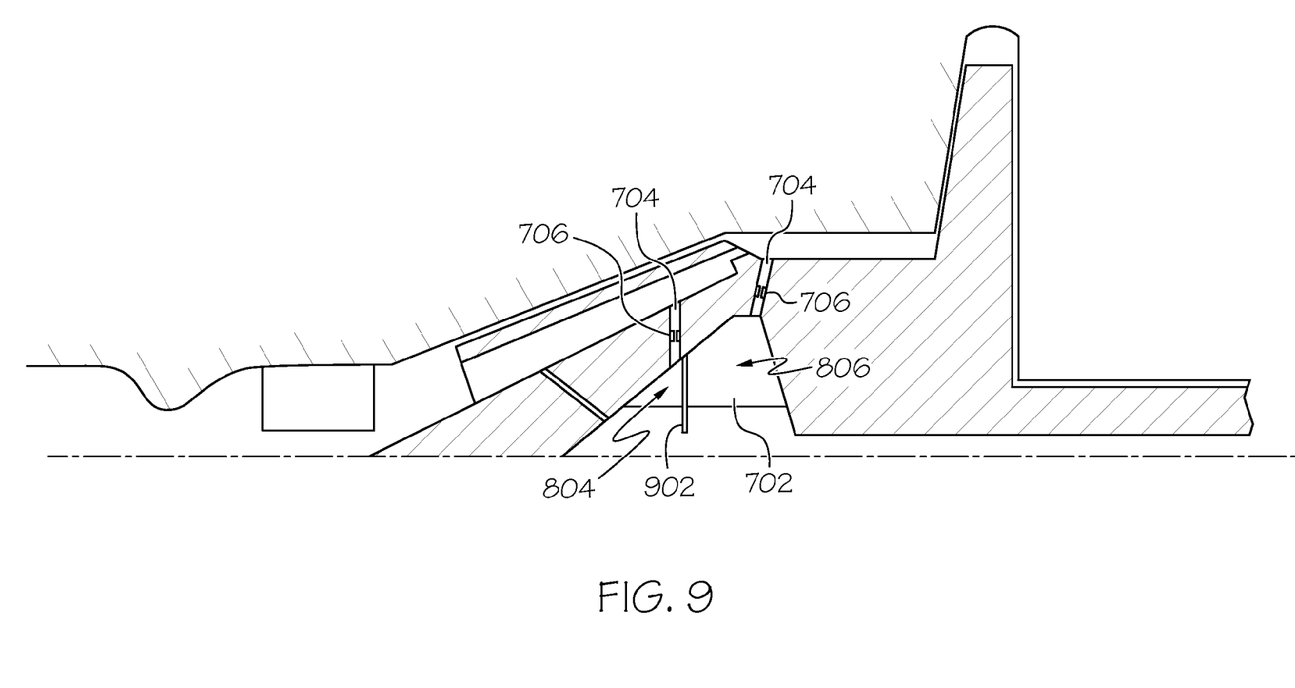

The in-line continuous flow liquid-gas separator-pump 106 may also be configured to implement secondary and tertiary liquid-gas separation within the inner chamber 522. To do so, the in-line continuous flow liquid-gas separator-pump 106 may include additional features. For example, as depicted in FIGS. 7-9, the separator-pump 106 may additionally include a plurality of radial vanes 702 and a plurality of liquid flow passages 704. The radial vanes 702 extend radially inwardly from the inner surface 516 of the rotor 504 into the inner chamber 522. The liquid flow passages 704 are formed in the rotor 504. In the depicted embodiment, each liquid flow passage 704 has an orifice 706 disposed therein, and each fluidly communicates the inner chamber 522 to a volume downstream of each fluid outlet 536. It will be appreciated that the orifices 706 are optional, and may not be included in some embodiments. When the rotor 504 rotates, the radial vanes 702, which also rotate, cause any liquid that is present in the inner chamber 522 to be forced toward the inner surface 516 of the rotor 504. The liquid may then flow through the liquid flow passages 704 to the volume downstream of the fluid outlets 536.

In addition to the radial vanes 702 and liquid flow passages 704, the separator-pump 106 may, in some embodiments, include a separation gate 902. As FIGS. 8 and 9 depict, the separation gate 902, if included, is coupled to the rotor 504 and extends radially into the inner chamber 522. The separation gate 902 separates the inner chamber 522 into a first inner chamber 804 and a second inner chamber 806. Although the embodiments depicted in FIGS. 8 and 9 include only a single separation gate 902, it will be appreciated that the separator-pump 106 may be implemented with multiple separation gates 902, if needed or desired, to provide further separation.

Regardless of the number of separation gates 902 that are included, in some embodiments, such as the one depicted in FIG. 8, a small weep hole 808 may be formed in the separation gate 902 to vent any liquid collected in the inner chamber 522. In other embodiments, such as the one depicted in FIG. 9, the separator-pump 106 may include additional liquid flow passages 704. These additional flow passages, are referred to herein as upstream liquid flow passages since each fluidly communicates the inner chamber 522 with one of the tubular flow passages 506 upstream of the fluid outlet 536. The other liquid flow passages 704 are referred to herein as downstream liquid flow passages since each fluidly communicates the inner chamber 522 downstream of each fluid outlet 536.

It should be noted that the tubular flow passages 506 may be variously shaped and configured. For example, the tubular flow passages 506 straight, as depicted in FIG. 5, or tapered, as depicted in FIGS. 6-9. Tapering of the tubular flow passages 506 may help offset the volume loss of the gas removal, and help prevent fuel pressure from dropping too low. The tubular flow passages 506 could, in some embodiments, be arranged in a helix/corkscrew pattern to improve transition of fuel flow from the liquid/gas inlet 126 to the spinning rotor 504. With this configuration, the pre-swirler 604 could, if desired, be eliminated.

The in-line continuous flow liquid-gas separator-pump 106 described herein can quickly and efficiently degas a liquid, such as jet engine fuel. It is also relatively lightweight, relatively compact, and can boost the pressure of the degassed liquid. The tubular design of disclosed separator-pump produces less turbulence and mixing of the incoming flow when compared to a bladed separator, which allows finer separation of the mixture, as opposed to coarser separation in bladed designs.

In this document, relational terms such as first and second, and the like may be used solely to distinguish one entity or action from another entity or action without necessarily requiring or implying any actual such relat or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth herein.

What is claimed is:

1. An in-line continuous flow liquid-gas separator-pump, comprising:
    a housing having a liquid/gas inlet, a liquid outlet, and a purge gas outlet;
    a rotor adapted to receive a drive torque and configured, upon receipt thereof, to rotate, the rotor including a rotor first end, a rotor second end, an inner surface, and an outer surface, the inner surface defining an inner chamber in fluid communication with the purge gas outlet;
    a plurality of tubular flow passages formed on the rotor, each tubular flow passage extending between the rotor first end and the rotor second end, each tubular flow passage including a fluid inlet and a fluid outlet, the fluid inlet of each tubular flow passage disposed adjacent the rotor first end and in fluid communication with the liquid/gas inlet, the fluid outlet of each tubular flow passage disposed adjacent the rotor second end and in fluid communication with the liquid outlet; and
    a plurality of gas flow passages formed in the rotor, each gas flow passage providing fluid communication between only one of the tubular flow passages and the inner chamber, wherein: the rotor has a truncated cone shape; the rotor first end has a smaller diameter than the rotor second end; and the plurality of tubular flow passages extend in a splayed manner between the rotor first end and the rotor second end;
    wherein:
        the fluid inlet of each tubular flow passage has a fluid inlet diameter;
        the fluid outlet of each tubular flow passage has a fluid outlet diameter; and
        the fluid outlet diameter is less than the fluid inlet diameter.

2. The in-line continuous flow liquid-gas separator-pump of claim 1, further comprising:
    a drive shaft coupled to the rotor and configured to supply the drive torque thereto, the drive shaft having a purge gas flow passage formed therein, the purge gas flow passage in fluid communication with the inner chamber.

3. The in-line continuous flow liquid-gas separator-pump of claim 1, wherein the rotor second end is configured as a centrifugal pump impeller extending radially outwardly from the rotor second end.

4. The in-line continuous flow liquid-gas separator-pump of claim 1, further comprising a plurality of radial vanes extending radially inwardly from the inner surface into the inner chamber.

5. The in-line continuous flow liquid-gas separator-pump of claim 1, further comprising:
    a plurality of liquid flow passages formed in the rotor, each liquid flow passage fluidly communicating the inner chamber downstream of each fluid outlet.

6. The in-line continuous flow liquid-gas separator-pump of claim 5, further comprising:
    a separation gate coupled to the rotor and extending radially into the inner chamber, the gate separating the inner chamber into a first inner chamber and a second inner chamber.

7. The in-line continuous flow liquid-gas separator-pump of claim 1, further comprising:
    a plurality of upstream liquid flow passages formed in the rotor, each upstream liquid flow passage fluidly communicating the inner chamber with one of the tubular flow passages upstream of the fluid outlet; and
    a plurality of downstream liquid flow passages formed in the rotor, each downstream liquid flow passage fluidly communicating the inner chamber downstream of each fluid outlet.

8. The in-line continuous flow liquid-gas separator-pump of claim 7, further comprising:
    a separation gate coupled to the rotor and extending radially into the inner chamber, the gate separating the inner chamber into a first inner chamber and a second inner chamber,
    wherein:
        each upstream liquid flow passage fluidly communicates the first inner chamber with one of the tubular flow passages upstream of the fluid outlet, and
        each downstream liquid flow passage fluidly communicates the second inner chamber downstream of each fluid outlet.

9. The in-line continuous flow liquid-gas separator-pump of claim 1, further comprising:
    a pre-swirler disposed within the housing upstream of the rotor first end and configured to rotate fluid entering the liquid/gas inlet.

10. The in-line continuous flow liquid-gas separator-pump of claim 1, further comprising:
    an orifice disposed within the housing upstream of the rotor first end and configured to reduce fluid pressure.

11. A rotor structure, comprising:
    a rotor having a truncated cone shape and including a rotor first end, a rotor second end, an inner surface, and an outer surface, the rotor first end having a first diameter, the rotor second end having a second diameter that is smaller than the first diameter, the inner surface defining an inner chamber;
    a plurality of tubular flow passages formed on the rotor, in a splayed manner, between the rotor first end and the rotor second end, each tubular flow passage including a fluid inlet and a fluid outlet, the fluid inlet disposed adjacent the rotor first end and in fluid communication with the liquid/gas inlet, the fluid outlet disposed adjacent the rotor second end; the plurality of tubular flow passages extend in a splayed manner between the rotor first end and the rotor second end and
    a plurality of gas flow passages formed in the rotor, each gas flow passage providing fluid communication between only one of the tubular flow passages and the inner chamber; wherein: the fluid inlet of each tubular flow passage has a fluid inlet diameter; the fluid outlet of each tubular flow passage has a fluid outlet diameter; and the fluid outlet diameter is less than the fluid inlet diameter.

12. The rotor structure of claim 11, further comprising:
a drive shaft coupled to the rotor and configured to supply the drive torque thereto, the drive shaft having a purge gas flow passage formed therein, the purge gas flow passage in fluid communication with the inner chamber.

13. The rotor structure of claim 11, wherein the rotor second end is configured as a centrifugal pump impeller extending radially outwardly from the rotor second end.

14. The rotor structure of claim 11, further comprising a plurality of radial vanes extending radially inwardly from the inner surface into the inner chamber.

15. The rotor structure of claim 11, further comprising:
a plurality of liquid flow passages formed in the rotor, each liquid flow passage fluidly communicating the inner chamber downstream of each fluid outlet; and
a separation gate coupled to the rotor and extending radially into the inner chamber, the gate separating the inner chamber into a first inner chamber and a second inner chamber.

16. The rotor structure of claim 11, further comprising:
a separation gate coupled to the rotor and extending radially into the inner chamber, the gate separating the inner chamber into a first inner chamber and a second inner chamber;
a plurality of upstream liquid flow passages formed in the rotor, each upstream liquid flow passage fluidly communicating the first chamber with one of the tubular flow passages upstream of the fluid outlet; and
a plurality of downstream liquid flow passages formed in the rotor, each downstream liquid flow passage fluidly communicating the second inner chamber downstream of each fluid outlet.

17. An aircraft fuel deoxygenation system, comprising:
a boost pump adapted to receive fuel from a fuel source and inert gas from an inert gas source, the boost pump configured to mix the fuel and inert gas and supply a fuel/gas mixture;
a contactor-separator coupled to receive the fuel/gas mixture and configured to remove oxygen from the fuel and thereby generate and supply deoxygenated fuel with entrained purge gas and separated purge gas; and
an in-line continuous flow liquid-gas separator-pump coupled to receive the deoxygenated fuel with entrained purge gas and configured to separate and remove the entrained purge gas from the deoxygenated fuel and supply the deoxygenated fuel and additional purge gas, the in-line continuous flow liquid-gas separator-pump comprising:
a housing having a liquid/gas inlet, a liquid outlet, and a purge gas outlet, the liquid/gas inlet coupled to receive the deoxygenated fuel with entrained purge gas;
a rotor adapted to receive a drive torque and configured, upon receipt thereof, to rotate, the rotor including a rotor first end, a rotor second end, an inner surface, and an outer surface, the inner surface defining an inner chamber in fluid communication with the purge gas outlet;
a plurality of tubular flow passages formed on the rotor and extending between the rotor first end and the rotor second end, each tubular flow passage including a fluid inlet and a fluid outlet, the fluid inlet disposed adjacent the rotor first end and in fluid communication with the liquid/gas inlet, the fluid outlet disposed adjacent the rotor second end and in fluid communication with the liquid outlet; the plurality of tubular flow passages extend in a splayed manner between the rotor first end and the rotor second end; and
a plurality of gas flow passages formed in the rotor, each gas flow passage providing fluid communication between only one of the tubular flow passages and the inner chamber; wherein: the fluid inlet of each tubular flow passage has a fluid inlet diameter; the fluid outlet of each tubular flow passage has a fluid outlet diameter; and the fluid outlet diameter is less than the fluid inlet diameter.

* * * * *